(No Model.) 2 Sheets—Sheet 1.
H. A. VEAZIE.
BICYCLE TIRE.
No. 563,822. Patented July 14, 1896.
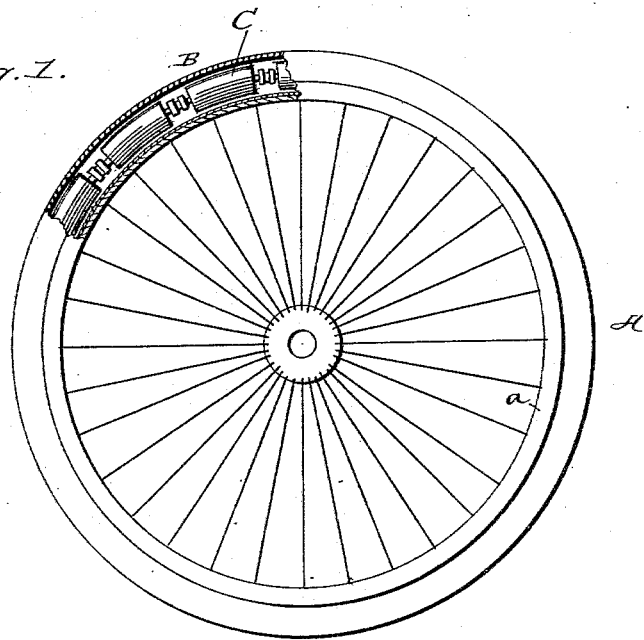
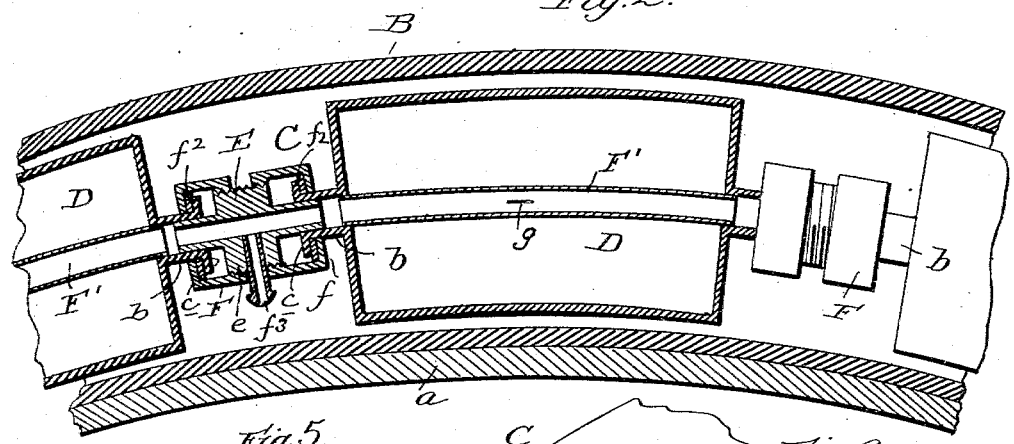
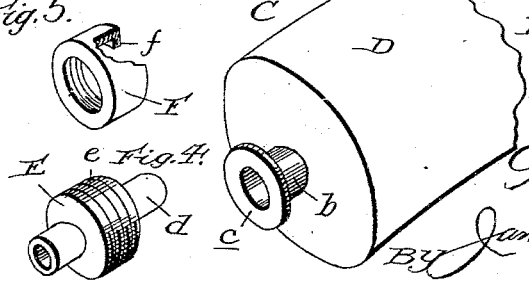
Witnesses:
C. A. Raeder
V. J. Beach
Inventor
H. A. Veazie
By James J. Skehy
Attorney

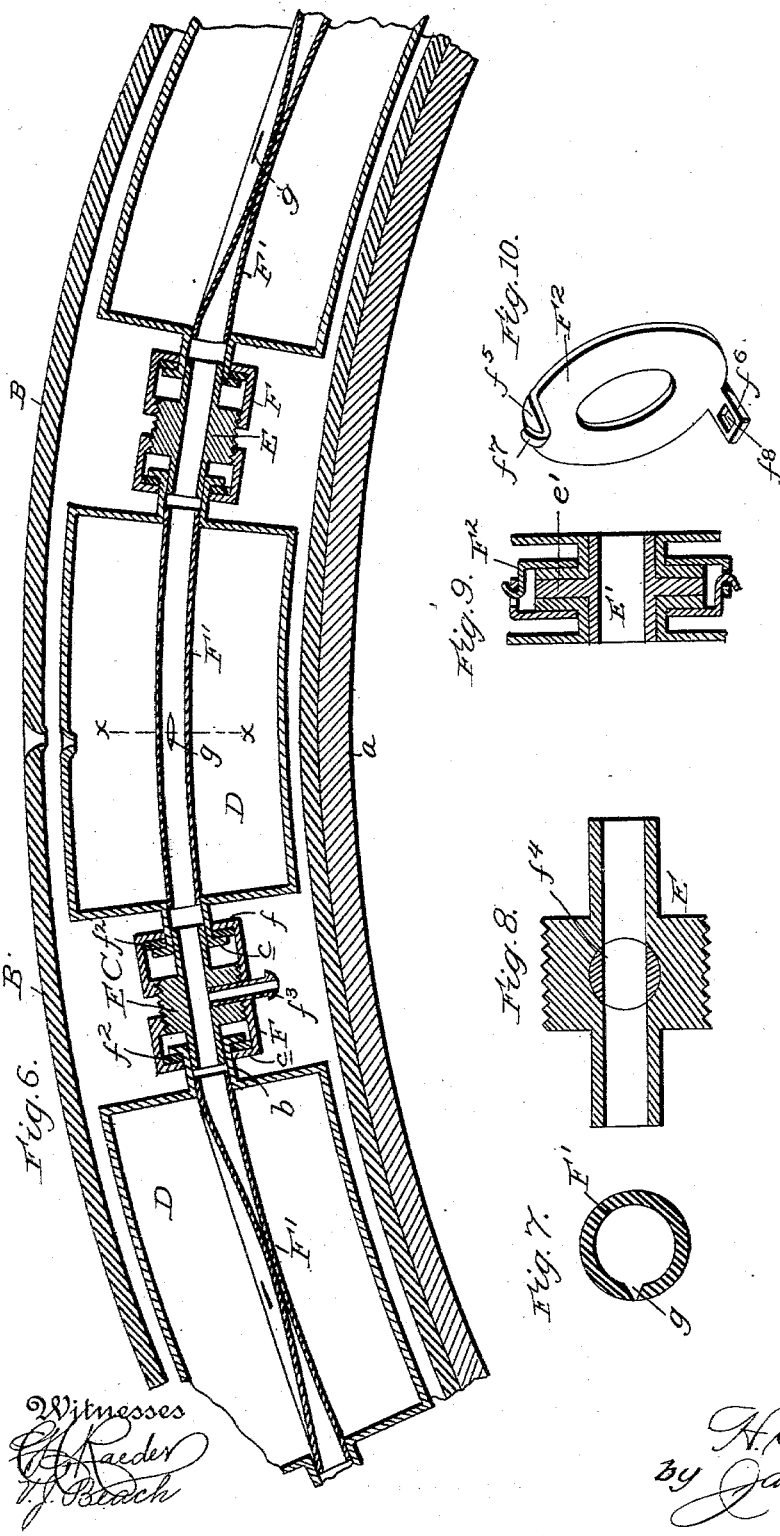

UNITED STATES PATENT OFFICE.

HENRY A. VEAZIE, OF NEW ORLEANS, LOUISIANA, ASSIGNOR OF ONE-HALF TO ROBERT G. MEMORY, OF SAME PLACE.

BICYCLE-TIRE.

SPECIFICATION forming part of Letters Patent No. 563,822, dated July 14, 1896.

Application filed February 28, 1896. Serial No. 581,097. (No model.)

*To all whom it may concern:*

Be it known that I, HENRY A. VEAZIE, a citizen of the United States, residing at New Orleans, in the parish of Orleans and State of Louisiana, have invented certain new and useful Improvements in Bicycle-Tires; and I do declare the following to be a full, clear, and exact description of the invention, such as will enable others skilled in the art to which it appertains to make and use the same.

My invention relates to improvements in pneumatic tires for bicycle and other wheels; and it has for its general object to provide such a tire comprising a plurality of inflatable sections or compartments communicating with each other and detachably connected together, so that when one is punctured it may be readily removed and be as readily replaced by a new section or compartment.

Another object of the invention is to provide a pneumatic tire comprising a plurality of inflatable sections or compartments communicating with each other and means adapted when one section or compartment is punctured to automatically close communication between said punctured section or compartment and the sections or compartments on opposite sides of the same, so as to prevent the escape of air and the collapse of any but the punctured section or compartment.

My invention also contemplates making the sections of such a size that one or two may be conveniently carried in the tool-case of a bicycle, so that in the event of one of the tire-sections being punctured at a place remote from a repair-shop it may be removed by the rider and replaced by one of the new sections or compartments.

With the foregoing ends in view the invention will be fully understood from the following description and claims when taken in conjunction with the annexed drawings, in which—

Figure 1 is an elevation of a wheel embodying my improvements with a portion of the tire-cover broken away. Fig. 2 is a detail sectional view illustrating a portion of the wheel-rim or felly, a portion of the tire-cover, and a portion of the improved tire, the latter being partly in elevation. Fig. 3 is a detail perspective view of a portion of one of the tire-sections. Fig. 4 is a perspective view of one of the unions for connecting the tire-sections. Fig. 5 is a perspective view, partly broken away, of one of the thimbles for use in conjunction with the unions. Fig. 6 is a detail sectional view illustrating the manner in which the air is prevented from passing into a punctured section or compartment. Fig. 7 is a transverse section taken in the plane indicated by the line $xx$ of Fig. 6. Fig. 8 is a detail view of a modified form of union for detachably connecting the sections or compartments together, and Figs. 9 and 10 are detail views of a modified coupling for effecting the detachable connection of the compartments or sections.

Referring by letter to said drawings, and more particularly to Figs. 1 to 6 thereof, A indicates a wheel which may have a rim or felly $a$ and may otherwise be of the ordinary or any other construction suitable to the purposes of my invention.

B indicates the tire-cover, which may also be of any suitable construction and material (preferably rubber) and may be detachably connected with the wheel-rim in any suitable manner that will permit of access being gained to the tire which it covers, and C indicates my improved tire. This tire C is made up of a suitable number of separate inflatable sections or compartments D, of rubber or other suitable material, and these sections or compartments communicate with each other, so as to enable an air-pump connected with one of the unions (presently described) to inflate all of the sections or compartments, and they are detachably connected together, so that when one is punctured it may be readily disconnected and replaced by a new section.

The sections or compartments D may be of any suitable form and construction and may be detachably connected, so as to establish communication between them in any suitable manner. I prefer, however, to make the sections D of such form that they will be circular or approximately circular in cross-section when inflated, and provide them at their ends with nipples $b$, which have flanges $c$ at their outer ends, as shown. These nipples $b$ may be formed integral with the sections D, or they may be formed of metal and be connected in an air-tight manner with the ends of the sections, and they are designed for the engagement of the unions E and thimbles F, which I prefer to employ for detachably connecting the sections D together and establishing communication between the same.

The unions E, which are tubular, as shown in Fig. 2, have the reduced portions $d$, which are designed to extend into the nipples of the sections D, and they also have the diametrically-enlarged and exteriorly-threaded portions $e$, as shown. These enlarged and threaded portions $e$ are designed for the engagement of the interiorly-threaded thimbles F, which are provided at their outer ends with the inwardly-directed flanges $f$, which are designed to bear against the sides of the nipple-flanges $c$, as shown in Fig. 2, and, in conjunction with the unions and the interposed washers $f^2$, effect air-tight connections between the nipples at the ends of the sections or compartments D. When the nipples $b$ of the sections D are made of metal, the thimbles F will be placed on said nipples at the time of manufacture for obvious reasons, but when the nipples are made of rubber, which is the preferred embodiment, the thimbles may be placed on the nipples by the user.

With the construction shown and described it will be seen that when one of the sections D is punctured and the tire collapses it is simply necessary, in order to repair the tire, to ascertain the section which is punctured, and then open or disconnect from the wheel-rim the portion of the cover B which covers said section. This being done, the punctured section may be readily disconnected from the two contiguous sections by turning the thimbles F, which engage it in the proper direction, and a new section may then be placed in position and connected to the other sections in the manner described. The tire may then be reinflated by an air-compressing pump in the ordinary manner. For this purpose one of the unions E of the tire will be provided with a valved or other suitable nipple or inflation-tube, which may be of the ordinary well-known construction and which in itself forms no part of my invention.

It will be seen that the sections D of my improved tire may be made of such a size that two, three, or more of them may be carried in the tool-case of a bicycle or on the person of the rider, and it will also be appreciated that in virtue of the construction described the rider may readily remove a punctured section and may as readily replace it with a new section, which is an important advantage and a desideratum in this class of devices.

In order to prevent the escape of compressed air from and the consequent collapse of all of the several compartments or sections D when one is punctured, I provide the said compartments or sections with the tubes F', of thin rubber or other thin collapsible material. (Better illustrated in Figs. 2, 6, and 7.) These thin rubber tubes F' extend the full length of the compartments or sections and into the nipples $b$, in which they are secured by cement or other suitable means, and they are of a slightly greater length than the sections or compartments D, so as not to be affected by stretching or crowding of the same, and are provided at or adjacent to their middles with the slits or openings $g$, which are preferably of the form shown in Fig. 7, and are therefore adapted to permit the air to pass from the tubes into the sections or compartments D, but prevent its return to the tubes. When all of the tubes F' of the tire are under equal pressure, the tubes are expanded, as shown in Fig. 2. Now, when one of the sections is punctured, the compressed air in said punctured section escapes through the puncture and the compressed air in the tube F' in said punctured section and also in the tubes of the sections next to the punctured section escapes into said punctured section and passes out through the puncture. This removes the pressure in the inside of the said tubes in the sections on opposite sides of the punctured section, and enables the pressure in the said sections to press and close the tubes, as shown in Fig. 6, and consequently prevent the escape of air through the tubes into the tube of the punctured section. In consequence of this when a section or compartment is punctured only the compressed air in said compartment will escape, and while the rider will be apprised of the puncture of the tire he may, if necessary, ride a considerable distance before removing the punctured section or compartment and replacing it with a new one. When, however, the punctured section or compartment is removed and replaced by a new one, it is simply necessary, in order to restore the "hardness" of the tire through the nipple or inflation-tube $f^3$, and also through the unions and tubes F', which form a conduit for connecting the nipple or inflation-tube $f^3$, and the sections or compartments D, to pump air into the tire until the pressure in the tubes F' is greater than the pressure in the sections D on opposite sides of the new section, when the tubes in said sections D will open and the compressed air will pass through said tubes and the tube of the new section into said new section and inflate the same.

When one of the sections or compartments is punctured, the unpunctured sections or compartments stretch a little and crowd the punctured section or compartment, and for this reason the tubes F' are made slightly longer than the sections or compartments, as before described, so as not to be affected by such stretching.

In lieu of the tubes F' the unions may be provided with cocks $f^4$, as shown in Fig. 8, which cocks may be turned, when a section or compartment is punctured, so as to close communication between said compartment and the unpunctured compartments or sections. When this construction is employed and a puncture occurs, all of the sections or compartments will collapse by reason of the air therein escaping. Connection may then be closed between the punctured section or compartment and the unpunctured sections or compartments, after which the latter sections or compartments may be reinflated. This construction, as will be readily observed, permits of the tire being temporarily used after one of the sections or compartments is punctured, which is an important advantage.

In Figs. 9 and 10 of the drawings I have illustrated a modified construction of coupling for connecting the sections or compartments together. This coupling comprises a union E', which has a collar-flange $e'$, and the plates $F^2$, of rigid and slightly-resilient material, which receive the nipples $b$ of the sections or compartments D, as illustrated. These plates $F^2$ are provided at diametrically opposite points with angular branches $f^5 f^6$, and one of these branches has a hook $f^7$ at its end, while the other branch has an eye $f^8$, as shown.

In using the modified form of coupling the reduced portions of the union E' are inserted in the nipples $b$ of the sections or compartments D, the plates $F^2$ having previously been placed on said nipples $b$, as shown. The hook of each plate is then sprung into the eye of the other plate, as illustrated, when the plates will be tightly connected together and the ends of the nipples will be pressed and held against the collar-flange of the union E', so as to prevent the escape of air therefrom.

Having described my invention, what I claim, and desire to secure by Letters Patent, is—

1. A wheel-tire comprising a plurality of separate inflatable sections having nipples at their ends provided with flanges, tubular unions having reduced portions inserted in the nipples of the inflatable sections and also having exteriorly-threaded portions, and interiorly-threaded thimbles engaging the threaded portions of the unions and having flanges engaging the flanges of the nipples at the ends of the inflatable sections, substantially as specified.

2. A wheel-tire having a rim or felly, a removable cover detachably connected with the rim or felly, and a tire arranged within the cover and comprising a plurality of separate inflatable sections having nipples at their ends provided with flanges, tubular unions having reduced portions inserted in the nipples of the inflatable sections and also having exteriorly-threaded portions, and interiorly-threaded thimbles engaging the threaded portions of the unions and having flanges engaging the flanges of the nipples at the ends of the inflatable sections, substantially as specified.

3. A wheel-tire comprising a plurality of inflatable compartments, an inflation tube or tube for the connection of an inflating device, and a conduit connected with the inflation-tube and extending through the compartments; the said conduit having its portions within the compartments collapsible or formed of thin rubber or other collapsible material and provided with apertures for effecting communication between the interior of the conduit and the interior of the compartments, substantially as specified.

4. As an improved article of manufacture, an inflatable section or compartment containing a collapsible tube of thin rubber or other collapsible material having an aperture at an intermediate point of its length; the said collapsible tube having its ends open and its end portions connected to the ends of the section or compartment and the said section or compartment being adapted to be connected with other sections or compartments to form a tire, substantially as specified.

5. A wheel-tire comprising a plurality of separate inflatable sections or compartments, collapsible tubes of thin rubber or other collapsible material arranged in the sections or compartments and extending in the direction of the length thereof and having their ends secured to the ends of the sections or compartments and also having openings at intermediate points of their length, and couplings detachably connecting the sections or compartments together and effecting communication between the tubes of the same, substantially as specified.

6. A wheel-tire comprising a plurality of separate inflatable sections or compartments having nipples at their ends provided with flanges, a union interposed between the nipples of the sections and having portions inserted in said nipples, and plates mounted on the nipples and connected together, substantially as and for the purpose specified.

7. A wheel-tire comprising a plurality of separate inflatable sections or compartments having nipples at their ends provided with flanges, collapsible tubes of thin rubber or other collapsible material arranged in the sections or compartments and extending in the direction of the length thereof and having their ends secured in the nipples of the sections or compartments and also having openings at intermediate points of their length, a union interposed between the nipples of the sections or compartments and having portions inserted in said nipples, and plates mounted on the nipples and connected together, substantially as and for the purpose set forth.

In testimony whereof I affix my signature in presence of two witnesses.

HENRY A. VEAZIE.

Witnesses:
F. J. ALEIA,
JAMES R. GUTHRIE.